United States Patent Office 3,367,742
Patented Feb. 6, 1968

3,367,742
CHEMICAL COMPOSITIONS AND PROCESSES
Ralph Marotta and Harry Teicher, St. Louis, Mo., assignors to Monsanto Company, St. Louis, Mo., a corporation of Delaware
No Drawing. Continuation-in-part of application Ser. No. 317,116, Oct. 18, 1963. This application June 22, 1966, Ser. No. 559,379
4 Claims. (Cl. 23—182)

ABSTRACT OF THE DISCLOSURE

A process for comminuting an amorphous, hydrophilic silica aerogel by attrition with superheated steam at temperatures of 250° C.–750° C. and pressures of 1 to 200 p.s.i.g. The resulting particles have a size in the range of 0.1 to 5.5 microns, a loose bulk density of $0.8 \times 10^{-3}$ to $18 \times 10^{-3}$ gm./cm.$^3$ and a total pore volume greater than 100 cm.$^3$/gm. They have utility as a flattening agent for coatings such as paints, varnish and resin formulations.

---

The subject matter of the present invention was disclosed, in part, in our copending application for Letters Patent, Ser. No. 317,116, now abandoned, filed in the United States Patent Office on Oct. 18, 1963. The present application should be considered in conjunction with said application Ser. No. 317,116 and considered as a continuation-in-part thereof.

The present invention relates to novel silica aerogels, and more particularly to a novel class of finely divided, dry, amorphous, silica aerogels. The present invention also relates to novel processes for the production of such aerogels. The present invention further relates to novel finely divided silica aerogels having certain unique properties, particularly with respect to particle size, particle size distribution, bulk density and pore volume. The novel aerogels of the present invention may be used as flatting agents in paint, varnish and resin compositions and are generally superior, for this use, to previously known silica products.

It has been proposed heretofore in U.S. Patent 2,093,454 dated Sept. 21, 1937, to Samuel S. Kistler to produce silica aerogels by precipitating colloidal silica in a liquid to form a gel, washing the gel with water to remove an appreciable amount of inorganic metal salts present therein, replacing the water in the gel with a lower boiling water-miscible liquid such as ethanol, confining the resultant gel in an autoclave and heating the gel until the liquid in the gel has reached a temperature at which the surface tension of the liquid is so small as to produce no substantial shrinkage of the gel when water vapor is allowed to escape. The vapor is then slowly released from the autoclave so as not to impair the internal structure of the gel. In this way the structure of the gel is preserved approximately in its original porous state and the product obtained is a light fluffy solid having void spaces or pores up to 99% and higher.

It has also been proposed heretofore in U.S. Patent 2,285,449 to Morris D. Marshall issued June 9, 1942 to prepare inorganic aerogels such as silica aerogels by first forming an aquasol containing a dissolved inorganic alkali metal salt and a colloidal inorganic oxide such as colloidal silica, adding to the aquasol a quantity of a water-miscible organic solvent such as ethanol to precipitate the salt, removing a substantial portion of the precipitated alkali metal salt from the resulting hydroorganosol and removing the liquid phase which consists of water and an organic solvent (e.g. ethanol) from the sol without substantially subjecting the sol to a compressive liquid-solid interface.

Silica aerogels prepared as described in the Kistler and Marshall patents generally have a highly porous structure and contain pores having a total volume of from about 600 to about 800 cubic centimeters per gram of silica aerogel. According to Kistler, when these aerogels are contacted with water they lose their porosity and become dense and lose their aerogel character. Aerogels which have been contacted with water in liquid or vapor form resemble precipitated silicas (sometimes referred to as xerogels) which are dense silica products and are generally prepared by drying silica aquagels in air at elevated temperatures and at atmospheric pressures.

The above-described silica aerogels have been widely used as insulating materials, as reinforcing agents or fillers in silicone rubber formulations and, when conventionally ground, as flatting agents in paint, varnish and resin formulations. Although both the aforedescribed silica products (e.g. silica aerogels and precipitated silica) have been used as flatting agents in coating compositions such as paint, varnish and resin formulations such materials possess certain disadvantages when so used. Such disadvantages include: the difficulty of initially uniformly dispersing the silica products in paint, varnish and resin formulations; the tendency of the silica products to settle out of the coating compositions on standing; and the tendency of the silica to form a hard compact mass in the bottom of the coating composition on standing in the packaging container, resulting in re-occurrence of the dispersion problem. Also, it has been necessary to employ relatively large amounts (e.g. up to 35% of the total solids content of the formulation) of the previously known silica products to attain the desired flatting effect and, when such quantities are employed the quality of the coating formed from the coating composition is often impaired, for example such coatings are often rough and are not as wear-resistant as unflatted or partially flatted coatings formed from compositions free of silica or containing only small amounts of silica product. Although attempts (such as prolonged grinding of aerogels in air and in the coating composition) have been made to overcome or to circumvent the above-described disadvantages such attempts have been generally unsuccessful.

The present invention provides, in part, a class of novel silica aerogels which have substantially all the utility and advantages of the previously known silica aerogels, and which, in addition, are substantially free of the disadvantages, properties (and problems accompanying the use) of the previously known aerogels and precipitated silicas as flatting agents in coating compositions. Generally, the silica aerogels of the present invention are more easily and readily dispersible in, and have a significantly less tendency to settle out of, paint and varnish compositions in which they are incorporated than prior art silica aerogels or precipitated silicas. Also, the novel silicas have a markedly better flatting efficiency (than such prior art silicas), that is, significantly lower quantities (e.g. less than 10% of the total solids content of the coating composition) of such novel silicas are sometimes required to achieve the desired flatting effect and the films or coatings obtained are smooth and wear-resistant.

It is one object of the present invention to provide novel finely divided silica aerogels having certain unique physical and chemical characteristics, as hereinafter set forth.

It is another object of this invention to provide improved processes for preparing such silica aerogels.

It is a further object of the present invention to provide finely divided, dry amorphous silica aerogels having certain unique properties, as hereinafter defined, which render them especially useful as flatting agents when incorporated in paint, varnish and resin formulations.

Still further objects and advantages of the present invention will become apparent from the following description and the appended claims.

The present invention provides finely divided, dry, amorphous, silica aerogels comprising silica aerogel particles having a particle size in the range of from about 0.1 to about 5.5 microns, an average particle size below about 2.5 microns, and an uncompressed bulk density in the range of from about $0.8 \times 10^{-3}$ to about $18.0 \times 10^{-3}$ grams per cubic centimeter. These silica aerogels are further characterized in having a pore volume of at least 1,000 cubic centimeters per gram of silica aerogel.

Surprisingly, in view of the usually adverse effect of water or moisture on silica aerogels referred to in the aforementioned Kistler patent, it has been found possible in accordance with the present invention to obtain and prepare the novel silica aerogels of this invention by a process which comprises comminuting or grinding amorphous silica aerogels, for example silica aerogels prepared as described in the Kistler and Marshall patents, in the presence of super-heated water vapor. When such amorphous silica aerogels are so comminuted the finely divided particles obtained have a more uniform particle size distribution, a significantly lower bulk density and a significantly higher porosity (e.g. a higher total volume of the pores) than silica aerogels which have been ground in an atmosphere of air as by the teachings of the prior art.

It is to be understood that in the present invention, the starting amorphous silica aerogels used and which are prepared according to the processes of the Kistler and Marshall patents, are inherently hydrophilic, that is, readily wettable by water as shown by reference to the Kistler patent. Thus, in the Kistler patent, page 1, right-hand column, lines 6–12, it is specifically disclosed that when such aerogels are treated with water and subsequently dried in the usual manner, there results a material shrinkage of the aerogel and said aerogels are thus converted into xerogels. Hence, it is clear the Kistler silica aerogels are water-wettable or hydrophilic. It is also clear from the teachings of Nickerson Patent No. 2,870,108, issued Jan. 20, 1959, that the silica aerogels prepared by the processes of the aforereferred to Kistler and Marshall patents are hydrophilic. (See column 3, lines 3–9 of said Nickerson patent.) The hydrophilic or water-wettable nature of the Kistler silica aerogels is also confirmed by the teachings of the Wetzel U.S. Patent No. 2,978,298, issued Apr. 4, 1961 (see column 1, lines 42–51).

As noted above, the size of the particles of the finely divided amorphous silica aerogels of the present invention varies within the range of from about 0.1 to about 5.5 microns. The particle size distribution of these particles is generally and usually such that from about 35% to about 45% by weight of the particles have a particle size in the range of 1 micron and less than 1 micron; from about 65% to about 55% by weight of the particles have a particle size greater than 1 micron and up to about 5.5 microns. The average particle size of these particles is below 2.5 microns and the particles preferably have an average particle size in the range of between about 1.8 and about 2.2 microns.

A preferred embodiment of the finely divided silica aerogels of this invention comprises finely divided, dry, silica aerogels consisting essentially of silica aerogel particles having a particle size distribution such that between about 10% to about 15% by weight of the particles have a particle size of 0.5 micron and/or less than 0.5 micron, about 25% to 30% by weight of the particles have a particle size greater than 0.5 micron but less than 1 micron, about 35% to about 45% by weight of the particles have a particle size of 1 micron and/or greater than 1 micron but less than 2 microns, from about 15% to about 20% by weight of the particles have a particle size of 2 microns and/or greater than 2 microns but less than 4 microns and from about 0% to about 5% by weight of the particles have a particle size of between about 4.0 and about 5.5 microns. The average particle size of these aerogel particles is as above described. These preferred finely divided aerogels of this invention also have an uncompressed bulk density in the range of from about $5 \times 10^{-3}$ to about $12 \times 10^{-3}$ grams per cubic centimeter and are further characterized in that the total pore volume of the aerogel pores is in the range of betwen 1000 and 1500 cubic centimeters per gram of silica aerogel.

The particle size of the particles of the silica aerogels described herein was determined by the centrifugal method described on pages 84 through 86 of the book "Particle Size" by R. R. Irani and C. F. Callis published by John Wiley & Son, New York, N.Y. (1963).

As previously noted the silica aerogels of this invention have a loose bulk density in the range of from about $0.8 \times 10^{-3}$ to about $18.0 \times 10^{-3}$ grams per cubic centimeter and, more preferably, a loose bulk density in the range of from about $5 \times 10^{-3}$ to about $12 \times 10^{-3}$ grams per cubic centimeter.

Generally, the finely divided prior art silica aerogels, hereinbefore referred to, have particle sizes which range from 1 to 20 microns and in which 20% by weight of the particles are greater than 10 microns and where the average particle size is in the range of from between about 6 to 8 microns. Such prior art aerogels also have a loose bulk density from 2 to 3 times greater (e.g. $35 \times 10^{-3}$ grams per cubic centimeter) than the bulk density of the silica aerogels of this invention.

The novel silica aerogels of the present invention are further characterized in that the pores thereof have a pore volume of at least 1000 cubic centimeters per gram of silica aerogel. The pore volume and pore diameter of the silica aerogels herein referred to were determined by the method of Brunauer, Emmet and Teller described in "Advances in Colloid Science," vol. 1, pages 1–36, published by Interscience Publishers, Inc., New York, N.Y. (1942).

The term "pore volume" as used herein is intended to mean and to include the volume of pores having a pore diameter equal to and less than 350 angstroms. Although silica aerogels generally have a small amount, e.g. from 10% to 15%, of pores which have a pore diameter above 350 angstroms, the volume of such pores, when the aforementioned method is employed, cannot be distinguished from the surface of the silica aerogel particles.

The finely divided silica aerogels prepared by the prior art processes have pores in which the pore volume is substantially smaller (that is, from about 600 to about 800 cubic centimeters per gram of silica aerogel), than the pore volume of the silica aerogel of the present invention. Preferred silica aerogels of this invention have pores of a size such that 85% of the pores have a diameter less than and up to 350 angstroms. In these preferred aerogels the pore volume of the pores is in the range of between 1000 and 1500 cubic centimeters per gram of silica aerogel.

As noted hereinbefore, and as will be evident from the following description, the silica aerogels of the present invention are significantly more efficient as flatting agents than prior art silica aerogels. Stated differently smaller quantities of the silica aerogels of this invention are required to accomplish the same degree of flatting when incorporated in paint, varnish and resin formulations than previously known silica aerogels or precipitated silicas. Also the silica aerogels of the present invention are much more readily dispersible in paint, varnish and resin formulations and tend to remain dispersed in such formulations for prolonged periods of time. In other words the aerogels of the present invention do not settle in paint and varnish formulations (in which they are incorporated)

to the extent that previously known silica products settle therein.

The reasons for the superior flatting and other properties of the aerogels of the present invention is not known with certainty. However, without being bound by theoretical considerations, the aerogels of the present invention are believed to be superior as a result of the novel combination of particle size, particle size distribution and the large volume of the pores of the silica aerogels. The smaller particle size and particle size distribution of the silica aerogels of this invention, as compared to the finely divided silica aerogels of the prior art, generally does not account for the flatting efficiency of the aerogels of the present invention since the finely divided prior art silica aerogels (whose particle size has been reduced by prolonged grinding or by grinding or milling in one or more of the liquid ingredients of paint, varnish and resin formulations) does not result in increased flatting efficiency of such aerogels in the final paint, varnish or resin formulations.

As previously noted the finely divided, dry, amorphous silica aerogels of this invention may be obtained by grinding or comminuting amorphous silica aerogels (particularly the silica aerogels described in the aforementioned Kistler and Marshall patents, that is aerogels which are inherently hydrophilic as aforenoted) in the presence of super-heated water vapor. This discovery was both surprising and unexpected since it was believed, because of the teaching in the Kistler patent, that the presence of water would destroy the porous nature and the loose bulk density of silica aerogels and would convert such aerogels into dense silica products resembling precipitated silicas (e.g. xerogels).

The starting silica aerogels which may be employed to obtain the novel silica aerogels of the present invention are generally characterized in having a total pore volume of from about 600 to about 800 cubic centimeters per gram, an uncompressed bulk density of about $35 \times 10^{-3}$ grams per cubic centimeter and a particle size in which the particles may range from 1 micron up to particles having a size at least in one dimension of ½ inch. When the starting silica aerogels are ground in air to a finely divided state the particle size of the particles is usually such that 20% by weight of the particles are greater than 10 microns and the average particle size is in the range of from between about 6 to 8 microns.

Any of the above silica aerogels may be ground or comminuted in the presence of super-heated water vapor to obtain silica aerogels of the present invention which, as noted hereinbefore, are characterized in having a particle size in the range of from about 0.1 to about 5.5 microns, an average particle size below about 2.5 microns, an uncompressed bulk density in the range of from about $8 \times 10^{-3}$ to about $18.0 \times 10^{-3}$ grams per cubic centimeter and the aerogels are further characterized in having a pore volume of at least 1000 cubic centimeters per gram of silica aerogel.

The above-described silica aerogels may be ground or comminuted in the presence of super-heated water vapor by a variety of methods and under a variety of conditions. For example, the aerogels can be comminuted in a mechanical grinding device such as a hammer mill to which a stream of super-heated water vapor is fed or, and alternatively, they can be comminuted in a ball mill to which is attached a means of introducing super-heated water vapor during the operation of the ball mill.

The grinding or comminuting of silica aerogels is essentially carried out at elevated temperatures in the range of from about 250° C. to about 750° C. and these temperatures are provided by the super-heated water vapor which is usually at temperatures within this range. When super-heated water vapor is employed the temperature in the grinding zone or chamber rapidly reaches equilibrium with the temperature of the super-heated water vapor and the comminuting is usually carried out at these temperatures.

In one embodiment of the processes of this invention it has been found advantageous to introduce an amorphous silica aerogel, preferably in the form of particles, into a comminuting zone or chamber maintained in the range of from about 250° C. to about 750° C. and to simultaneously introduce moving super-heated water vapor into the zone at a rate sufficient to provide attrition of the aerogel whereby through such attrition, the aerogel is comminuted to a finely divided state. After such comminution has been effected, at least a portion of the water vapor and comminuted aerogel particles are withdrawn from the comminuting zone where the comminuted aerogel particles may be separated from the super-heated water vapor by conventional methods of separating solids from a gas. As will be hereinafter evident, it is usually advantageous to separate the aerogel particles from the super-heated water vapor at a temperature above about 250° C.

Under all of the above-described grinding or comminuting methods the temperatures of the super-heated water vapor and silica aerogel may vary in the range of from about 250° C. to about 750° C., and preferably in the range of from about 270° C. to about 350° C. Although higher temperatures (e.g. above 750° C.) may be employed there is no particular advantage and the cost of the heat tends to render the process uneconomical. Although temperatures below about 250° C. may sometimes be employed there is a danger that some of the silica aerogel particles will become dense and will resemble precipitated silicas and/or certain of the prior art silica aerogels.

It was indeed surprising to find that when a moving stream of air, either at room temperature or at a temperature above 350° C., was used to comminute the aerogels in place of the super-heated water vapor, the particle size, bulk density and pore volume of the silica aerogels obtained resembled that of the previously known aerogels. Silica aerogels so produced are quite different with respect to the particle size, bulk density and pore volume of the comminuted silica aerogels obtained when super-heated water vapor is employed.

As noted above, moving super-heated water-vapor is introduced into the comminuting zone at a rate sufficient to provide attrition of aerogel particles. The rate at which super-heated water vapor is introduced may vary greatly depending upon the size and configuration of the comminuting zone. Generally the steam is introduced at a rate sufficient to provide a pressure (of super-heated water vapor) in the range of from about 1.0 p.s.i.g. to about 200 p.s.i.g. in the zone.

The introduction of super-heated water vapor into the zone may be suitably accomplished by forcing the super-heated water vapor into the zone through one or more orifices of conventional design such as for example through steam nozzles It has also been found advantageous to place or arrange the orifices in the zone so that the super-heated water vapor will be introduced into the zone in the form of a plurality of streams, preferably multi-directional streams, in order that turbulence is produced within the zone and more efficient attrition between the particles of silica aerogel will occur. When aerogel particles are introduced into the zone under any of the above-described conditions the particles are fluidized, that is, they float around and are dispersed in the stream of super-heated water vapor and as turbulence increases undergo attrition by collision with each other and/or collision with the walls of the comminuting zone and/or undergo attrition through the force of the stream or streams of super-heated water vapor.

The particle size of the starting silica aerogels which are introduced into the comminuting zone may vary widely but usually have a particle size such that all the particles have, at least in one dimension, a size of from about 1/64 to about ½ inch and preferably, a particle size such that substantially all of the particles pass through a No. 4 mesh U.S. standard screen and all or substantially all of the particles will be retained on a No. 8 mesh U.S. Standard screen. Such particles are generally readily fluidized and may be comminuted in a relatively short period of time, e.g. a period of from several seconds to several minutes, when particles having particle sizes within the above-defined ranges are introduced into the comminuting zone the particles are immediately fluidized (e.g. dispersed and suspended) in the moving stream of super-heated water vapor and the grinding or comminution of the aerogels to a finely divided state proceeds rapidly due to the formation of turbulence within the chamber.

The comminuting zone or chamber may be any rigid, walled structure and may have the shape of a tube or cylinder or a rectangular shape having openings through which the super-heated water vapor and coarse aerogel particles may be introduced into the zone and an exit space through which the comminuted aerogels and super-heated water vapor may be removed from the chamber and separated from each other. Although any chamber such as that above-described may be employed it has been found particularly advantageous to employ a commercially available air attrition or fluid energy mill, for example, a commercial "Jet-O-Mizer" mill manufactured by the Fluid Energy Processing Equipment Company of Philadelphia, Pa. Such mills are particularly advantageous in that they are constructed (generally in the form of an annular cylinder) so that air may be forced into the grinding chamber along with the materials to be ground and such chambers are also provided with means for the removal of the comminuted materials. Such mills may be readily modified so that super-heated water vapor instead of air may be used as the grinding medium.

As noted previously, the super-heated water vapor is usually introduced into the comminuting zone through nozzles at a rate sufficient to provide a pressure in the range of from about 1.0 p.s.i.g. to about 200 p.s.i.g., and the pressure in the chamber at the point or points of entry of the super-heated water vapor and the coarse aerogel particles is usually in the range of between 140 p.s.i.g. to about 150 p.s.i.g. If the pressure in the chamber falls below about 1.0 p.s.i.g. prolonged grinding times, e.g. up to 30 minutes, may be required. Although pressures up to above 200 p.s.i.g. may be employed there is no advantage and a chamber or zone having reinforced walls (which is usually uneconomical) is required under such conditions.

One advantageous process for preparing the finely divided, silica aerogels of this invention comprises introducing particles of an amorphous silica aerogel having a particle size such that substantially all of the particles pass through a No. 4 mesh U.S. Standard screen and substantially all of the particles are retained on a No. 8 mesh U.S. Standard screen into a comminuting zone maintained at a temperature in the range of from about 350° C. to about 750° C. Simultaneously there is introduced into the comminuting zone a plurality of streams of super-heated water vapor at a rate sufficient to provide a pressure in the range of from about 1.0 p.s.i.g. to about 200 p.s.i.g. in the chamber. By so proceeding there is furnished sufficient energy to provide attrition of the aerogel particles and the particles are comminuted to a finely divided state after which they may be withdrawn and separated from the super-heated water vapor at a temperature above about 250° C. which is usually the temperature of the super-heated water vapor. However, it is important that the temperature during the separation step be maintained above 250° C. and if such temperature is permitted to drop below 250° C. some of the aerogel particles will become dense and resemble precipitated silicas and the final product will not have the flatting efficiency of the aerogels of this invention when incorporated in paint, varnish and resin formulations.

The aerogels of the present invention may also be continuously prepared by a process in which particles of an amorphous silica aerogel are continuously introduced into a comminuting zone such as hereinbefore described which is continuously maintained at a temperature in the range of about 350° C. to about 750° C. In this process there is simultaneously and continuously introduced into the zone a plurality of moving streams of super-heated water vapor thereby continuosly furnishing sufficient energy to provide attrition of the aerogel particles and the aerogel particles are continuously comminuted to a finely divided state. In this continuous process at least a portion of the water vapor and comminuted aerogel particles are continuously withdrawn from the zone and the aerogel particles are continuously separated by conventional means from the super-heated water vapor at temperatures above 250° C. as above-described. The grinding zone or chamber is usually maintained at the desired temperature upon contact of the super-heated water vapor. However, the chamber may be preheated to the desired temperature by any conventional means prior to the introduction of the super-heated water vapor into the chamber. The finely divided silical aerogels are preferably separated from the super-heated water vapor by gravity, that is they are permitted to fall to the bottom of a separatory receptacle. It is important however that the silica aerogels and the separatory receptacle be maintained at a temperature above about 250° C. to prevent the finely divided aerogels from becoming contaminated with moisture in the form of liquid water.

A further understanding of the novel silica aerogels and processes of the present invention will be obtained from the following examples which are intended to illustrate the invention but not to limit the scope thereof, parts and percentages being by weight unless otherwise specified.

*Example I*

An acidic silica ethanol aquasol at a temperature of 20° C. and having a colloidal silica content of 9.5%, sodium sulfate content of 0.3%, an ethanol content of 50%, a water content of 40% and containing sufficient free sulfuric acid to provide a pH of about 3.0 (glass electrode) was pumped through a sand filter to remove solid particles suspended therein and then through a column of a strong cation exchange resin at an average rate of 130 grams per minute. This column, which was 2 inches in diameter and 34 inches high, consisted of water insoluble beads of the hydrogen or acid form of "Dowex" 50 (a strong cation exchange resin consisting of water insoluble beads of a copolymer of styrene ar-ethyl-vinylbenzene and divinylbenzene which copolymer contains nuclear sulfonic acid groups) which is described in vol. 69, pages 28–30, of the Journal of the American Chemical Society, having a capacity of 4.25 milligram equivalents per gram. The ethanol aquasol was allowed to pass through a column until a composite effluent from the column had a pH of about 2.0 (glass electrode) and this composite effluent was substantially free of sodium ions. The composite effluent from the cation exchange resin was next passed downwardly through a column of anion-exchange material in sulfate form at an average rate of 130 grams per minute. This column, which was 2 inches in diameter and 34 inches high consisted of water insoluble beads of the sulfate form of a strongly basic quaternary ammonium anion-exchange resin composed of the reaction product of trimethylamine and a chloromethylate copolymer of about 87% by weight of styrene, 5% by weight of ethyl vinylbenzene and 8% by weight of divinylbenzene is immersed in sufficient water to cover the beads. The anion-exchange material had a capacity of about 1.69 milli-equivalents per gram. Samples of the effluent from the anion-exchange column were analyzed for sulfate ions periodically by titrating the sample with a solution of known concentrations of barium perchloride in isopropanol using thoron as the indicator for excess barium ions. During the major part of the run through the column, the sulfate content of the effluent was above 0.0005% (calculated as Na₂SO₄) and the specific conductants at 20° C. were 93 mocromhos. At this stage the pH of the total effluent was about 4.0.

The bulk of the ethanol aquasol so prepared was charged to an autoclave until 75% of the volume of the autoclave was occupied by the sol. The autoclave was then closed and heated until a pressure of 1900 pounds per square inch gauge (p.s.i.g.) (which was slightly above the critical pressure) was attained during which time the sol was converted to an ethanol-aquagel in situ. Heating was continued and ethanol and water vapor was released intermittently for the autoclave to maintain the pressure at 1900 p.s.i.g. until a temperature of 300° C. was attained. This temperature was above the critical temperature of the liquid phase of the ethanol-aquagel. The vapor in the autoclave was released slowly until substantially all of the vapor was removed and the autoclave was then cooled. A silica aerogel of excellent quality containing about 99% void spaces and having a specific surface area of 275 square meters per gram was obtained. The silica aerogel so obtained was characterized in having a total volume of 720 cubic centimeters per gram (determined as nitrogen at standard temperature and pressure) and have uncompressed bulk densities of $35 \times 10^{-3}$ grams per cubic centimeter. The aerogel was light, friable and fluffy, inherently hydrophilic, as aforenoted, and readily broken into large chunks. A portion of the aerogel so prepared was fed into the hopper of the hammer mill along with a stream of super-heated water vapor at atmospheric pressure and at a temperature of 400° C. The discharge portion of the hammer mill was confined so that the aerogel would be repeatedly ground and the operation was continued for 30 minutes. At the end of this time an aerogel having an average particle size of 2.1 microns, a loose bulk density of $6 \times 10^{-3}$ grams per cubic centimeter and having a total pore volume of 1263 cubic centimeters per gram of silica aerogel was obtained. The finely divided silica aerogel was incorporated in nitrocellulose lacquer and was found to be readily dispersible and to be an excellent flatting agent.

*Example II*

A portion of the unground silica aerogel prepared as described in Example I was broken into large particles about ½ inch in diameter, placed in a ball mill through which a stream of super-heated water vapor flowed. The milling operation was continued for about 40 minutes after which a finely divided silica aerogel was obtained which had an average particle size of 1.8 microns, a pore volume of 1060 cubic centimeters per gram and a loose bulk density of $10.2 \times 10^{-3}$ grams per cubic centimeter was obtained.

*Example III*

A portion of the unground silica aerogel prepared as described in Example I was pre-ground in a laboratory mill in air at room temperature to a particle size in which all of the particles passed through a No. 4 mesh U.S. Standard screen and substantially all of the particles were retained on a No. 8 mesh U.S. Standard screen. The pre-ground gel was then introduced into the grinding chamber of a Jet-O-Mizer fluid energy mill. Simultaneously there was introduced into the chamber through jet nozzles a moving stream of super-heated water vapor. The water vapor was introduced into the chamber through the nozzles at a rate sufficient to provide a pressure of between 140 and 150 p.s.i.g. and a temperature of about 300° C. The feed rate of the pre-ground aerogel particles was at the rate of about 10 pounds per minute. The grinding or comminuting time was from between 30 and 90 seconds. By so proceeding it was possible to produce finely divided silica aerogels having an average particle size of 1.9 microns and a particle size distribution such that 13% of the particles had a size of 0.5 micron and less, 27% of the particles had a particle size in the range of between 1 micron and 0.5 micron, 39% of the particles had a particle size in the range of between 1 and 2 microns, 17% of the particles had a particle size in the range of between 2 to 4 microns and 4% of the particles had a particle size in the range of between 4 and 5.5 microns. The aerogel so prepared was also characterized in having a loose bulk density of $6 \times 10^{-3}$ grams per cubic centimeter and had a pore volume of 1440 cubic centimeters per gram. The particle size of particles were measured by the method of Irani and Callis and the pore volumes were measured by the method of Brunauer, Emmet and Teller hereinbefore referred to. The aerogel so prepared was incorporated into a nitrocellulose lacquer where it was found to be readily dispersible and to provide excellent flatted films when the nitrocellulose lacquer containing the silica aerogel was applied to a surface and permitted to dry.

*Example VI*

A silica aerogel prepared as described in Example I of U.S. Patent 2,927,083, issued Mar. 1, 1960, to Ralph F. Nickerson and having an Na₂SO₄ content of 3% was determined to have a pore volume of 650 cubic centimeters per gram, a bulk density of $37 \times 10^{-3}$ and was pre-ground in air into coarse particles of about ⅛ inch diameter. The silica aerogel, which was inherently hydrophilic, was then ground using the apparatus and procedure described in Example III. The silica aerogel so obtained had a pore volume of 1350 cubic centimeters per gram, a loose bulk density of $9 \times 10^{-3}$ grams per cubic centimeter, an average particle size of 1.7 microns and a particle size distribution such that about 12% of the particles had a size of 0.5 micron and less, 28% of the particles had a particle size in the range of between 1 micron and 0.5 micron, 40% of the particles had a particle size in the range of between 1 and 2 microns, 16% of the particles had a particle size in the range of between 2 and 4 microns and 4% of the particles had a particle size in the range of between 4 and 5.0 microns.

*Example V*

Fifty-nine parts of a linseed oil modified glycerin-phthalic anhydride alkyd resin varnish of medium oil length and containing 38% solids was thinned with 205 parts of medium boiling naphthenic hydro-carbon solvent. Into this mixture 20 grams of finely divided silica aerogel, prepared as described in Example II, were ground in a one quart pebble mill at 60 r.p.m. for a period of about 10 hours to form a mill base. One hundred parts of new varnish were added to the mixture in the pebble mill and the resulting mixture was ground for one hour at 60 r.p.m. Thereafter, 250 parts of varnish were added to the pebble mill and the resulting mixture was ground for another hour at 60 r.p.m. to provide a flat varnish. The silica aerogel in the varnish remained in a flocculant condition giving a varnish which retained its excellent appearance and properties over an extended period of time. The aerogel in the varnish did not settle to form a cake but on the contrary formed a voluminous layer which was readily dispersed by simple agitation.

A flatting varnish prepared in the same manner but employing silica aerogel which had been ground in a ball mill for 84 hours in air at room temperature prior to the incorporation in a varnish settled to the bottom within several days in the form of a hard gummy mass.

*Example VI*

A phenolic varnish was prepared as follows: 100 pounds of a pure phenolic resin prepared by heating para-tertiary amyl phenol with formaldehyde under alkaline conditions and 12.5 gallons of alkali refined linseed oil were heated to a temperature of 565° F. within a period of 40 minutes and held at that temperature for a period of 90 minutes. Twelve and five-tenths gallons of tung oil were added and the batch was heated to a temperature of 500° F. and held at that temperature until it had a viscosity of E. The batch was then cooled and thinned with mineral spirits until it contained 50% solids. Sufficient amounts of cobalt and lead naphthenate were then added to the thin batch to provide 0.03% cobalt and 0.3% lead respectively as metal based on the oil in the batch. Two hundred fifty-eight parts of the above-described varnishes were thinned with 50 parts of a medium boiling naphthenic hydro-carbon solid and 10 parts of silica aerogel prepared as described in Example III were ground to smoothness in a one quart pebble mill for about 8 hours. A flatting varnish was thus obtained in which the silica aerogel was finely flocculated. After aging for 6 months the silica aerogel particles in the varnish had settled in a thick layer and were easily redispersed by simple stirring. By way of contrast an equivalent amount of silica which had been ground in air in an air attrition mill at room temperature settled to the bottom to form a thick gummy mass within one week.

*Example VII*

Portions of the silica aerogels prepared as described in Examples III and IV were incorporated into resin and varnish formulations in the amounts indicated below.

TABLE 1

| Ingredient | Formulation No. | | | |
|---|---|---|---|---|
| | 1 | 2 | 3 | 4 |
| Vinyl Resin | 20.17 | 20.17 | | |
| Alkyd Resin | | | 38.52 | 38.52 |
| Organic Solvents | 72.62 | 72.62 | 55.45 | 55.45 |
| Silica Aerogel (Example III) | 7.21 | | 6.0 | |
| Silica Aerogel (Example IV) | | 7.21 | | 6.0 |

Only a small amount of settling occurred in these samples after six weeks of storage on a laboratory shelf. Films were prepared by painting the above formulations on smooth glass surfaces. The films were uniformly painted and permitted to dry. The degree of flatting was determined by light reflectance using a Gardner Multi-Angle Glossmeter which measured the light reflectance photoelectrically. All reflectance measurements were taken at a light angle of 60°. The lower values indicating the less light reflection.

TABLE 2

| Formula No.: | Gloss (percent light reflected at 60°) |
|---|---|
| 1 | 4 |
| 2 | 8 |
| 3 | 12 |
| 4 | 12 |
| Unflatted vinyl resin | 89 |
| Unflatted alkyd resin | 70 |

When previously known aerogels which had been ground in air at atmospheric pressure were incorporated into the above-described formulations in place of the silica aerogels of Examples II and III from 25 to 30% of these aerogels were required to produce films having substantially the same light reflectance as the films prepared in Formulas 1 through 4. Also such films due to the large amount of silica employed were grainy and tended to be brittle.

In order to demonstrate the criticality of the temperature of the super-heated water vapor which is used during the comminution of a hydrophilic aerogel, i.e. such as those aerogels produced by the processes set forth in the Marshall and Kistler patents, Example III heretofore set forth was twice repeated with the exception being that in each case the temperature of the said water vapor was significantly lower than or below 250° C., i.e. the minimum temperature required in the operation of the present invention. These lower temperatures are indirectly suggested or taught in U.S. Patent 2,660,564 issued to Walter M. Davis on Nov. 24, 1953. (The Davis patent is generally directed to a process for fluffing or reducing the apparent density of materials of the nature of aerogels such as inorganic oxide aerogels, such as silica aerogels; carbon black; diatomaceous earth; and the like. However, in the Davis process which uses an air-jet ejector, it is also suggested in column 3, lines 45–47 and column 4, lines 12–14, that steam at from 50 to 125 p.s.i.g. can be used in place of air.)

In the first repeat of Example III (Run 1) the silica aerogel, which was produced by the process outlined in Example I and which is also the same type aerogel suggested for use in the Davis patent (note column 5, lines 1 and 2), was comminuted in the Jet-O-Mizer in the presence of steam which had a pressure of 125 p.s.i.g. and a temperature of 168° C. In the second repeat (Run 2) of Example III, the steam had a pressure of 56 p.s.i.g. and a temperature of 128° C. The aerogel material prepared in each repeat of Example III was dispersed in several organic solvents such as butyl alcohol and mineral spirits in order to ascertain the compatibility therein. Furthermore, said aerogel material was incorporated into a nitrocellulose lacquer, some of which was applied to a surface and allowed to dry. The other part was allowed to stand for several weeks. The end results of proceeding in the manner set forth in Example III of the present invention are set forth in Table 3. Also set forth in Table 3 for comparative purposes are the results of Example III of the present invention which utilized a steam pressure of 145 p.s.i.g. which had a corresponding steam temperature of 300° C.

In view of the results obtained and the data set forth in Table 3, it can readily be seen that the difference in temperatures, that is, the necessity of having a temperature of above 250° C. as required in the present invention as contrasted to the Davis temperatures of 168° C. and 128° C. (Runs 1 and 2, respectively, which correspond to the disclosed pressure range of 50 to 125 p.s.i.g.), produce silica products which are completely different from the present invention silica aerogels and are unsatisfactory as flatting agents. Specifically, the bulk density of the silica product produced by the Davis patent is approximately 7 to about 33 times greater than the bulk density of the present invention silica aerogel. Furthermore, the average particle size was ascertained to be about 10 to about 15 times greater than the average particle size of the present invention silica aerogel. With more particular reference to the utility of the Davis product, it was noted that when these silica products of Davis were incorporated in various organic solvents such as alcohols and mineral spirits the compatibility therewith was very unsatisfactory as contrasted with the ex-

TABLE 3

| Process Conditions | Prior Art (Davis Patent U.S. 2,660,564) | | Present Invention (Example III) |
|---|---|---|---|
| | Run 1 | Run 2 | |
| Live steam, p.s.i.g. | 125 | 56 | 145 |
| Temp. of steam entering grinder, ° C. | 168 | 128 | 300 |
| Feed rate, gms./min. | 300 | 300 | 300 |
| Product Characteristics: | | | |
| Moisture, Percent by weight | 18.8 | 59.5 | 3.0 |
| Pore volume, cc./gm. | 950 | 880 | 1,440 |
| Loose uncompressed bulk density, gms./cc. | $40 \times 10^{-3}$ | $197 \times 10^{-3}$ | $6 \times 10^{-3}$ |
| Compatibility in organic solvents | (1) | (2) | (3) |
| Dispersibility in nitrocellulose lacquer for flatting of films | (1) | (2) | (3) |
| Appearance of dry films | (4) | (5) | (6) |
| Average particle size, microns | 21 | 36 | 1.9 |

[1] Poor.
[2] Very poor.
[3] Good.
[4] Rough.
[5] Very rough.
[6] Smooth.

cellent compatibility when the present invention aerogels were incorporated therein. By the same token, when Davis' silica products were dispersed in a nitrocellulose lacquer which was used for the flatting of films, Davis' products were also unsatisfactory in that said materials settled to the bottom after several weeks and formed a hard, gummy mass. On the other hand, the present invention silica aerogels were easily dispersed in said lacquer, remained in a flocculant condition, did not settle to form a cake, and after several weeks formed a voluminous layer which was readily dispersed by simple agitation. Upon applying these nitrocellulose lacquers (to a surface) with the Davis' silica products contained therein, it was noted that the dried films were unsatisfactory in that they were rough appearing and in some cases were very rough in appearance. On the other hand, when the said lacquer containing the present invention silica aerogel was dried on the surface, the film was smooth in appearance. Thus it can readily be seen in view of the aforementioned data in Table 3 and the statements made in the earlier part of this specification that the temperature of the super-heated water vapor which is used to comminute a hydrophilic silica aerogel is quite critical and such temperature must be used in order to produce a silica aerogel which can be used as flatting agents in paint, varnish, and resin compositions.

What is claimed is:

1. A finely divided, dry, amorphous, silica aerogel comprising silica aerogel particles having (1) a particle size in the range of from about 0.1 to about 5.5 microns, (2) an average particle size below about 2.5 microns, and (3) a loose uncompressed bulk density in the range of from about $0.8 \times 10^{-3}$ to about $18.0 \times 10^{-3}$ grams per cubic centimeter; said silica aerogel being further characterized in having a total pore volume of at least 1000 cubic centimeters per gram of silica aerogel, consisting substantially of silica and having a utility as a flatting agent for coating compositions such as paints, varnish and resin formulations.

2. A finely divided, dry, amorphous, silica aerogel comprising silica aerogel particles having (1) a particle size distribution such that from about 35% to 45% by weight of the particles have a particle size in the range of 1 micron and less than 1 micron and from about 65% to about 55% by weight of the particles have a particle size greater than 1 micron and up to about 5.5 microns, (2) an average particle size of between about 1.8 and 2.2 microns, and (3) a loose uncompressed bulk density in the range of from about $0.8 \times 10^{-3}$ to about $18.0 \times 10^{-3}$ grams per cubic centimeter; said silica aerogel being further characterized in that the pore volume of the pores is in the range of between about 1000 and 1500 cubic centimeters per gram of silica aerogel, consisting substantially of silica and having a utility as a flatting agent for coating compositions such as paints, varnish and resin formulations.

3. A finely divided, dry, amorphous, silica aerogel consisting essentially of silica aerogel particles having (1) a particle size distribution such that between about 10% to about 15% by weight of the particles have a particle size of 0.5 micron and less than 0.5 micron, about 25% to about 30% by weight of the particles have a particle size greater than 0.5 micron but less than about 1 micron, about 35% to about 45% by weight of the particles have a particle size of 1 micron and greater than 1 micron but less than 2 microns, from about 15% to about 20% by weight of the particles have a particle size of 2 microns and greater than 2 microns but less than 4 microns and from about 0% to about 5% by weight of the particles have a particle size of between about 4 and about 5.5 microns, (2) an average particle size of between about 1.8 and 2.2 microns, and (3) a loose uncompressed bulk density in the range of from about $5 \times 10^{-3}$ to about $12 \times 10^{-3}$ grams per cubic centimeter; said silica aerogel being further characterized in that the pore volume of the pores is in the range of between 1000 and 1500 cubic centimeters per gram of silica aerogel, consisting substantially of silica and having a utility as a flatting agent for coating compositions such as paints, varnish and resin formulations.

4. A continuous process for preparing a finely divided, dry, amorphous silica aerogel which comprises continuously introducing particles of an amorphous, hydrophilic, silica aerogel; having a particle size such that substantially all of the particles pass through a No. 4 mesh U.S. Standard screen and having a pore volume substantially less than 1000 cubic centimeters per gram, into a comminuting zone, continuously maintaining said zone at a temperature in the range of about 250° C. to about 750° C., continuously and simultaneously introducing into said zone super-heated water vapor at a rate sufficient to continuously provide a super-atmospheric pressure in said zone of from about 1.0 p.s.i.g. to about 200 p.s.i.g. to produce turbulence and to furnish sufficient energy within said zone to provide attrition of said aerogel particles whereby said aerogel particles are continuously comminuted to a finely divided state to produce a silica aerogel characterized in having a particle size in the range of from about 0.1 to about 5.5 microns, an average particle size below about 2.5 microns, an uncompressed bulk density in the range of from about $0.8 \times 10^{-3}$ to about $18.0 \times 10^{-3}$ grams per cubic centimeter and having a total pore volume of at least 1000 cubic centimeters per gram of silica aerogel; continuously separating said last mentioned silica aerogel particles from said water vapor at a temperature above about 250° C.

References Cited

UNITED STATES PATENTS 3,079,234  2/1963  Jenkins et al. _____ 23—182
3,131,072  4/1964  Taulli _____ 23—182 X
3,210,273  10/1965 Taulli _____ 23—182 X

OTHER REFERENCES

Chemical Engrs. Handbook, 3rd edit., p. 1145 relied on.

MILTON WEISSMAN, *Primary Examiner.*

OSCAR R. VERTIZ, *Examiner.*

A. J. GREIF, *Assistant Examiner.*